United States Patent
Jonsson

(10) Patent No.: US 6,572,181 B2
(45) Date of Patent: Jun. 3, 2003

(54) PILLAR FOR A VEHICLE BODY

(75) Inventor: Martin Jonsson, Luleå (SE)

(73) Assignee: SSAB Hardtech AB, Lulea (SE)

( * ) Notice: Subject to any disclaimer, the term of this patent is extended or adjusted under 35 U.S.C. 154(b) by 0 days.

(21) Appl. No.: 09/904,187

(22) Filed: Jul. 12, 2001

(65) Prior Publication Data

US 2002/0067051 A1 Jun. 6, 2002

Related U.S. Application Data

(63) Continuation of application No. 09/457,978, filed on Dec. 9, 1999, now Pat. No. 6,267,438, which is a continuation-in-part of application No. PCT/SE98/01123, filed on Jun. 10, 1998.

(30) Foreign Application Priority Data

Jun. 10, 1997 (SE) .............................................. 9702234

(51) Int. Cl.[7] .................................................. B60J 7/00
(52) U.S. Cl. ........................... 296/203.03; 296/203.01; 296/203.02
(58) Field of Search ....................... 296/203.03, 203.01, 296/187, 204

(56) References Cited

U.S. PATENT DOCUMENTS

| 4,615,558 A | | 10/1986 | Nakamura et al. | |
|---|---|---|---|---|
| 4,682,812 A | * | 7/1987 | Hurten et al. | 296/188 |
| 4,971,359 A | | 11/1990 | Takahashi et al. | |
| 5,094,504 A | | 3/1992 | Wurl | |
| 5,096,254 A | | 3/1992 | Sparke | |
| 5,228,741 A | * | 7/1993 | Ide | 296/203.03 |
| 5,242,209 A | | 9/1993 | Yamaauchi | |
| 5,246,264 A | * | 9/1993 | Yoshii | 296/203.03 |
| 5,398,989 A | | 3/1995 | Winter et al. | |
| 5,560,672 A | * | 10/1996 | Lim et al. | 296/203.01 |
| 5,609,385 A | * | 3/1997 | Daniel et al. | 296/203.01 |
| 5,624,150 A | | 4/1997 | Venier | |
| 5,653,495 A | * | 8/1997 | Bovellan et al. | 296/188 |
| 5,720,510 A | * | 2/1998 | Daniel et al. | 296/203.02 |
| 5,722,715 A | * | 3/1998 | Patel et al. | 296/189 |
| 5,725,271 A | * | 3/1998 | Patel et al. | 296/189 |
| 5,800,008 A | * | 9/1998 | Gondo | 280/751 |
| 5,833,303 A | | 11/1998 | Kawai et al. | |
| 5,860,694 A | * | 1/1999 | Seefried et al. | 296/203.03 |
| 5,938,275 A | * | 8/1999 | Kleinhans et al. | 296/203.03 |
| 5,988,733 A | * | 11/1999 | Kamo et al. | 296/203.01 |
| 5,992,924 A | * | 11/1999 | Noritake et al. | 296/189 |
| 6,042,176 A | * | 3/2000 | Ikeda et al. | 296/203.03 |
| 6,254,172 B1 | * | 7/2001 | Takahara | 296/203.03 |
| 6,267,438 B1 | * | 7/2001 | Jonsson | 296/203.03 |
| 2001/0005092 A1 | * | 6/2001 | Sakyo et al. | 296/203.03 |
| 2001/0024054 A1 | * | 9/2001 | Mikuni | 296/203.03 |
| 2001/0033096 A1 | * | 10/2001 | Hanyu | 296/203.01 |
| 2002/0033618 A1 | * | 3/2002 | Kwon | 296/203.03 |
| 2002/0063444 A1 | * | 5/2002 | Kim | 296/203.02 |

FOREIGN PATENT DOCUMENTS

| EP | 0753450 | 1/1997 |
|---|---|---|
| EP | 0760329 | 3/1997 |
| FR | 756286 | 12/1933 |
| GB | 1490535 | 11/1977 |
| GB | 2341584 | 3/2000 |
| SE | 509888 | 3/1999 |

* cited by examiner

*Primary Examiner*—Kiran Patel
(74) *Attorney, Agent, or Firm*—Mark P. Stone

(57) ABSTRACT

A beam, comprising two beam portions of sheet steel connected together to form the beam. At least one of the beam portions has a hat profile that has its flanges joined to the other beam.

8 Claims, 3 Drawing Sheets

PILLAR FOR A VEHICLE BODY

CONTINUING APPLICATION DATA

The present application is a continuation of U.S. patent application Ser. No. 09/457,978, filed on Dec. 9, 1999, now U.S. Pat. No. 6,267,438 which claims continuation-in-part status from International Application No. PCT/SE98/01123, filed on Jun. 10, 1998, which claims priority from Swedish Application No. 9702234-7, filed on Jun. 10, 1997. U.S. patent application Ser. No. 09/457,978 was pending as of the filing date of the present application. International Application No. PCT/SE98/01123 was pending as of the filing date of U.S. patent application Ser. No. 09/457,978. The United States was an elected state in International Application No. PCT/SE98/01123.

BACKGROUND OF THE INVENTION

1. Field of the Invention

The present invention relates to a deep profile beam that has two side flanges with bent edges and a low profile beam that has two side flanges. The hat profile beams face in the same direction so that one hat profile beam is located substantially within the other profile beam.

2. Background Information

The demands on side impact energy absorption increase continuously and the pillars are important for this energy absorption. At the same time as the demands on impact energy absorption increase, the demands on weight reduction are also increased.

OBJECT OF THE INVENTION

It is an object of the present invention to provide an energy absorbing pillar or support that is both less costly and lighter in weight than conventional pillars with corresponding energy absorption properties.

SUMMARY OF THE INVENTION

This object is fulfilled in principle in that the one of the beams making up the pillar that is adjacent the interior of the vehicle body is a hat profile beam that has its flanges on the outer third of the thickness of the pillar and preferably at the very outermost part of the pillar. This hat beam will then be the major energy absorbing part of the pillar and it will utilize a major part of the space available for the pillar. The present invention has been given the characteristics defined in the claims.

In particular when the pillar is a B-pillar, it is advantageous that the other beam making up the pillar extends into the hat profile beam. Then the hinges for the rear door can be mowed to this other beam and located inside the hat beam. Then the front edge of the rear door can swing into the part of the other beam that is located in the hat profile beam. Then, the hat beam utilizes the available space ultimately.

In other words, the second beam can preferably extend into the hat profile beam. The hinges for the rear door of the vehicle can be attached to the other beam. The front edge of the rear door can thus rotate into the region of the hat profile beam. This effectively utilizes the available space.

Since the hat profile beam adjacent the interior of the vehicle body has its opening outwardly directed, it can be formed as one piece with a cross beam in the form of a hat profile or with a first part of such a cross beam which can then be extended by having another part jointed:, for example welded to it. Then, the cross beam can be arranged to take support on or be fixed to a central tunnel of the vehicle floor so that input forces can be transmitted to this central tunnel.

The above discussed embodiments of the present invention will be described further herein below with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention will be described with reference to the accompanying drawings which show an example of the invention, in which.

DESCRIPTION OF THE PREFERRED EMBODIMENT

Figure 1:
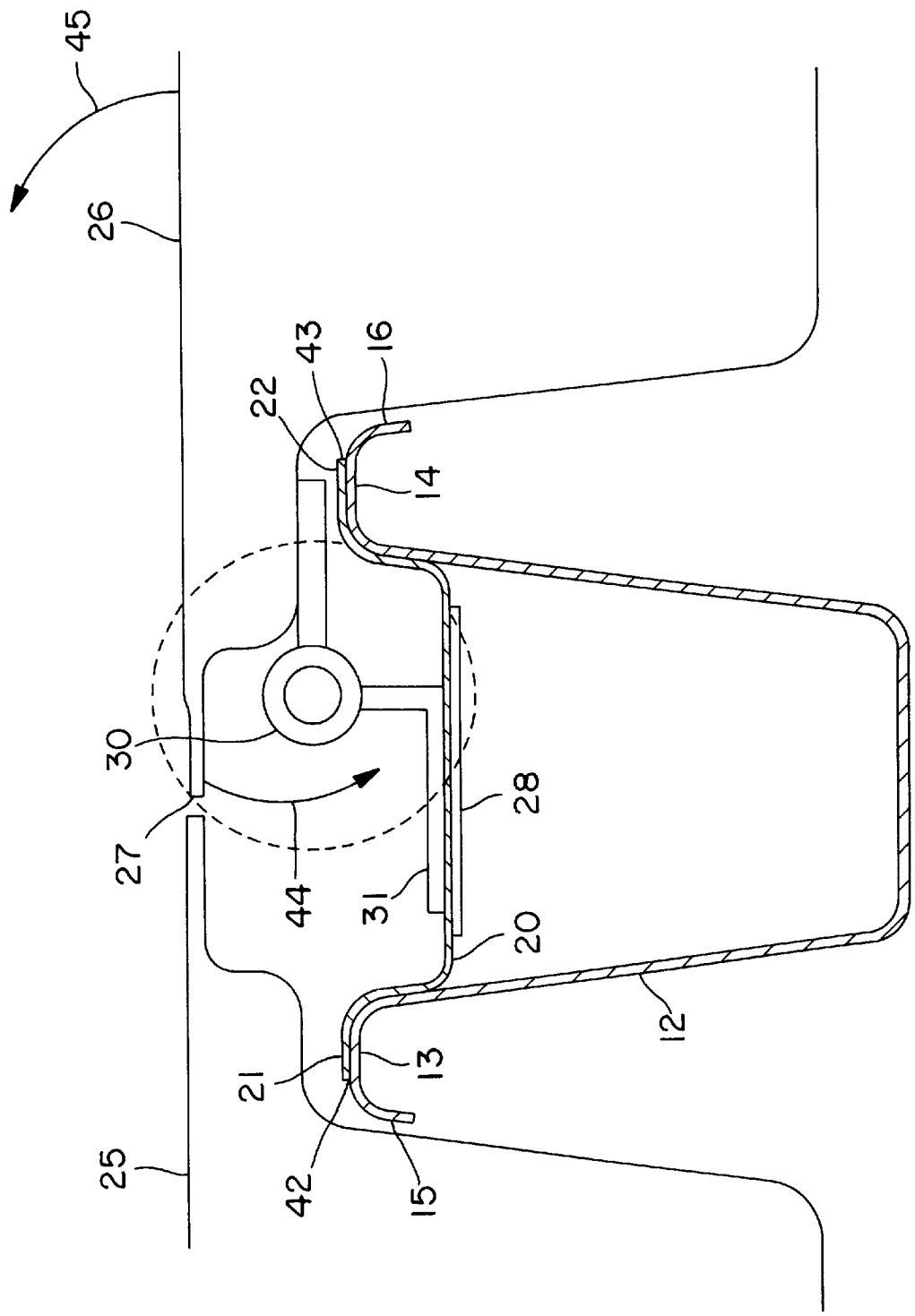
FIG. 1 illustrates a complete pillar, in section, and also parts of a front door and a rear door in accordance with the present invention.

FIG. 1 shows a deep profile beam 12 has two side flanges 13, 14 with bent edges 15, 16 and the low profile beam 20 has two side flanges 21, 22. The hat profiled beams 12, 20 face in the same direction so that the beam 20 is located substantially within the beam 12. As illustrated by FIG. 1, both the inner beam 12 and the outer beam 20 have opened sides facing in a direction outwardly relative to the motor vehicle (i.e., towards a front door 25 and a rear door 26 of the car). The side flanges 13, 14 and 21, 22 of the beams 12 and 20, respectively, are jointed in pairs by spot welding as generally designated by reference numerals 42 and 43.

Figure 2:
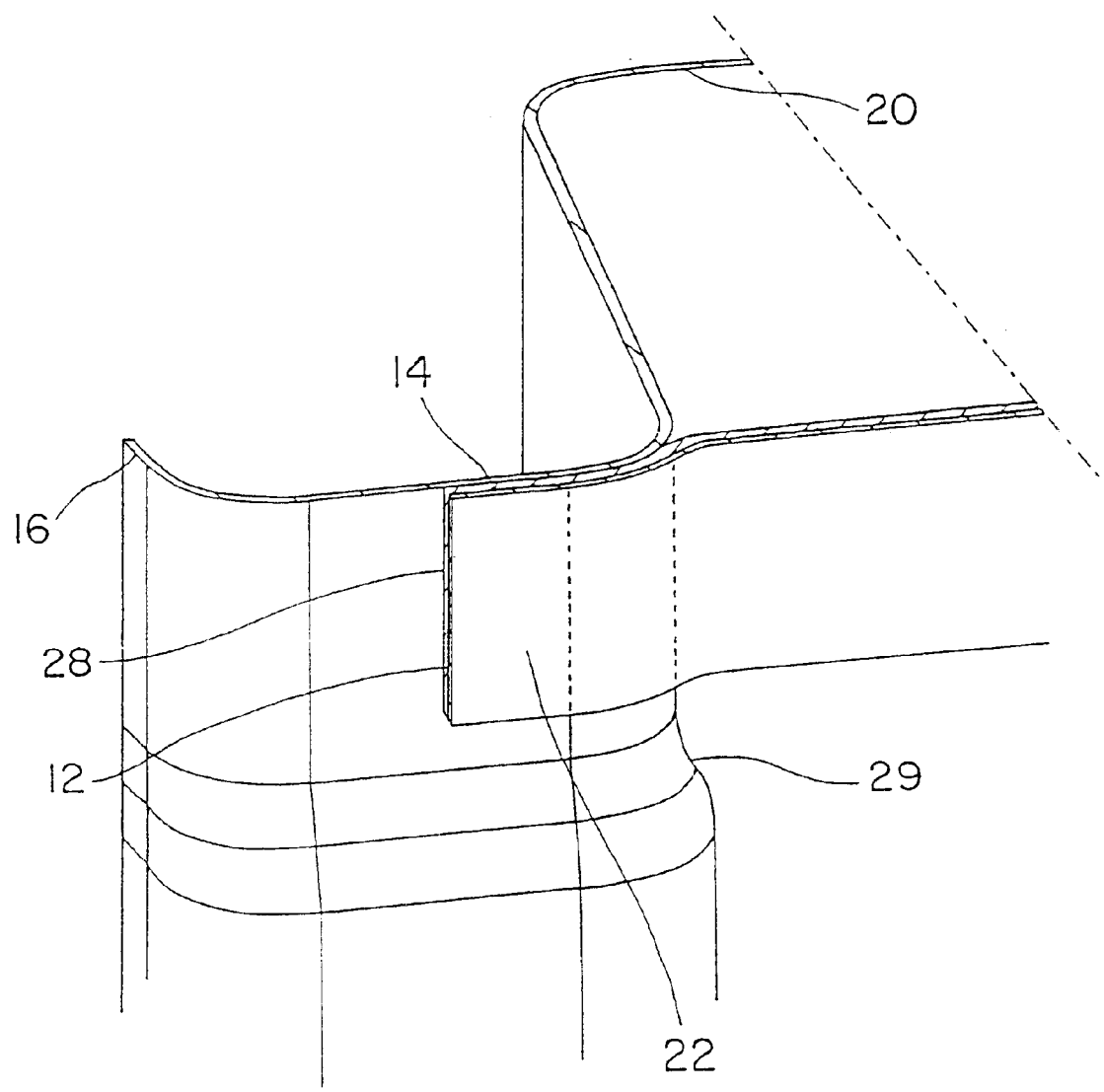
FIG. 2 is a perspective view showing a detail of the pillar or support.

In FIG. 1, the front door 25 and the rear door 26 of the car are also shown. The hinge 30 of the rear door 26 has a part 31 fixed to the beam 20. At the part 31, the beam 20 is reinforced at its back by a plate 28 that is connected, for example spot welded, to the beam 20. FIG. 2 shows a modified reinforcing plate 28. The beam 20 has an intrusion 29 as deep as the thickness of the plate 28 and the plate 28 follows the profile of the beam 12 under the flanges of the beam 12.

The hat profile beam 20 is thus preferably adjacent the exterior of the vehicle body whereas the main profile beam 12 is adjacent the interior of the vehicle body and both beams have concave sides facing outwardly. As shown by the dotted circle, the rear edge 27 of the rear door 26 will swing into the profile beam 20 as shown by arrow 44 when the door is opened as shown by arrow 45, which means that the distance between the side flanges 13, 14 of the hat profile beam 12 and the outer panels of the doors can be reduced as compared to conventional B-pillars. The beam 12 can thus have a deeper profile and utilize the available space more efficiently, which makes the pillar more efficient. This is a preferred and most efficient design. Alternatively, the outer beam 20 can be a flat plate or even be a hat profile beam with its crown outwardly directed. In the later design, the flanges should be at least at the outer third or at the outer fourth of the thickness of the pillar, otherwise the efficiency in energy absorption will be reduced.

Figure 3:
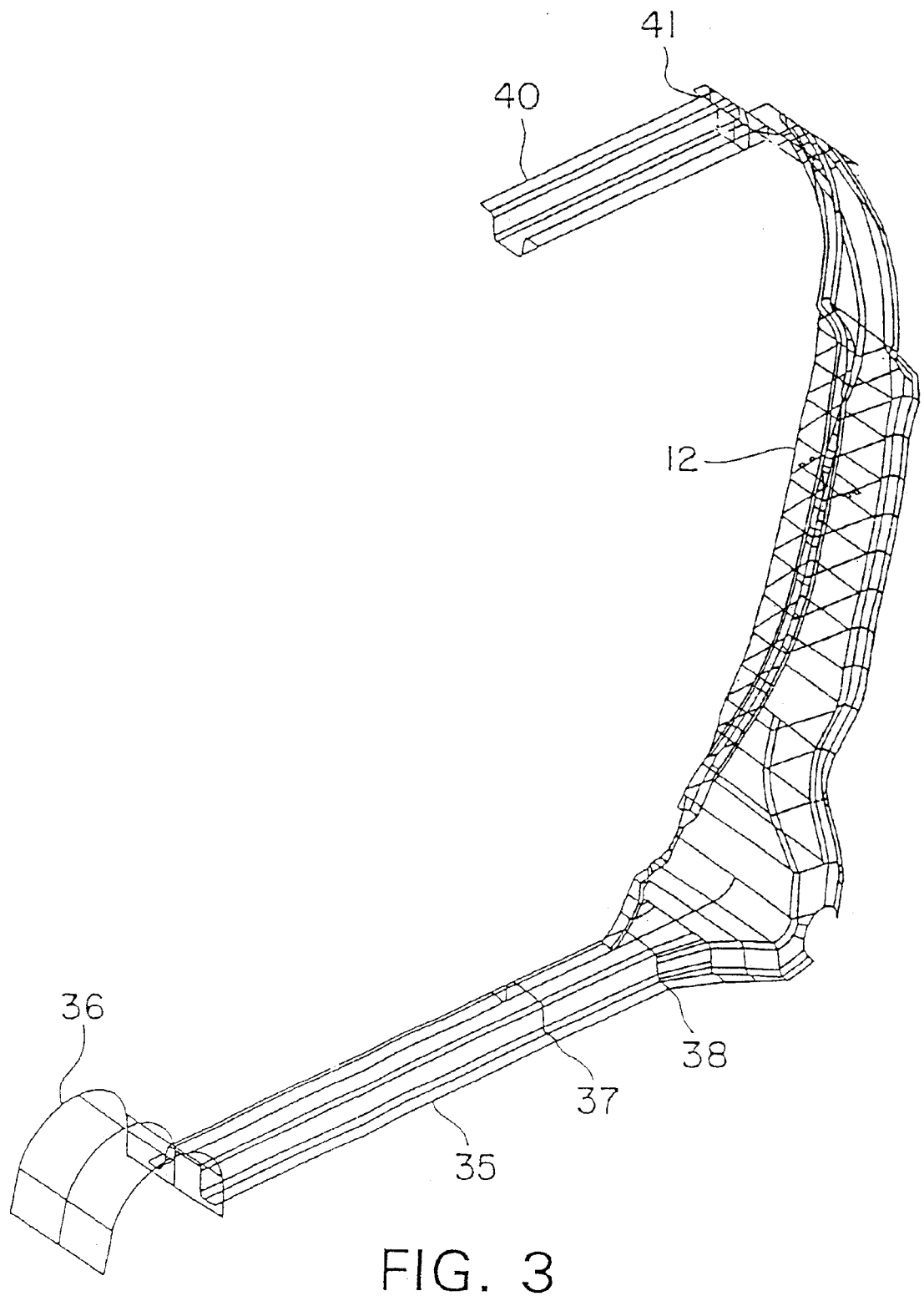
FIG. 3 is a transparent perspective view of the major beam that forms a B-pillar and it shows also upper and lower cross beams jointed to the pillar.

In FIG. 3, the beam 12 is shown but not the beam 20. The beam 12 has a cross section that varies and it is wider and has a lower height at the threshold than in its middle portion. Suitably, the beam 12 is formed and hardened with the press-hardening method (hot-stamped and hardened in one operation in cooled tools) and it can be formed in one piece with a cross beam 35 that is to be fixed to the vehicle floor, suitably by spot welding, and take support against a central tunnel 36 in the vehicle floor so that forces from a side impact will be transmitted to the central tunnel 36. Suitably, a short piece of the cross beam 35 close to the pillar should be milder than the other parts of the cross beam 35 and the beam 12 so that it forms a deformation zone. It can be milder for example by being unhardened or annealed. The cross beam 35 can be jointed for example at 37 or 38 to the part of the cross beam that is adjacent the beam 12 and formed as an integral part therewith. In the same way, a short piece of a roof beam 40 can be formed as an integral part of the beam 12 and extended. The entire roof beam 40 can alternatively be formed separately and fixed to the upper part of the beam 12 at 41 suitably by spot welding or other suitable means of attachment.

In other words, and in conjunction with at least one embodiment of the present invention, the beam 12 can be designed as an integral piece extending over the opposing sides and the top and bottom of the vehicle. Alternatively, the beam 12 can be formed so that it attaches to separate top and/or bottom support beams, or can partially extend over the top and/or bottom.

The press-hardening method is not described in detail herein but reference is made to GB-1490535, which is hereby incorporated by reference as if set forth in its entirety herein.

FIGS. 1, 2 and 3 show a B-pillar of a vehicle in the form of, for example, a passenger car, which pillar comprises a hat profile beam 12 having a deep profile and a hat profile beam 20 having a lower profile.

A pillar, in particular a B-pillar, for a vehicle body, in particular a passenger car body, comprises a hat profile beam that has its crown towards the interior of the body. A lower hat profile beam has its own crown located within the crown of the beam and the flanges of the two beams are spot welded together. The hinges of the rear door are fixed to the beam. The front edge of the rear door swings into the crown of the beam when the door is opened. Thus, the beam has a high crown and utilizes the available space efficiently.

One feature of the invention resides broadly in the pillar for a vehicle body comprising two beams of sheet steel joined together, a first one 20 of the beams adjacent the outward side of the body and the second one 12 adjacent the interior of the body, and at least one of the beams 12 is a hat profile that has its flanges coupled to the other beam, characterized in that said second beam 12 is said hat profile-beam and the two beams 12, 20 have such a form that the flanges 13, 14 of the second beam 12 are at the outer third of the thickness of the pillar.

Another feature of the invention resides broadly in that said flanges 13, 14 are at the outer most part of the pillar. Yet another feature of the invention resides broadly in that said first beam 20 extends into said second beam 12.

Still another feature of the invention resides broadly in that said first beam 20 is a hat profile beam.

A further feature of the invention resides broadly in that the hinges 30 for the rear door are mounted in said first beam 20.

Another feature of the invention resides broadly in that said second beam 12 is formed in one piece with a cross beam 35 or part of a jointed cross beam 35.

Yet another feature of the invention resides broadly in that the cross beam 35 take support against a central tunnel 36 in the body floor.

Still another feature of the invention resides broadly in that said second beam 12 and the cross beam 35 are in hardenable steel and a part of the cross beam near the second beam 12 is not hardened or annealed so that it forms a deformation zone.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following U.S. Patents, which may contain examples of vehicle pillars which may be used in conjunction with embodiments of the present invention, are hereby incorporated by reference as if set forth in their entirety herein: U.S. Pat. No. 5,954,390, issued Sep. 21, 1999 to Kleinhoffer et al.; U.S. Pat. No. 5,718,451, issued Feb. 17, 1998 to White; U.S. Pat. No. 5,968,614, issued Oct. 19, 1999 to Reichenberger et al.; U.S. Pat. No. 5,855,407, issued Jan. 5, 1999 to Fukuda; U.S. Pat. No. 5,720,510, issued Feb. 24, 1998 to Daniel et al.; U.S. Pat. No. 5,609,385, issued Mar. 11, 1997 to Daniel et al.; U.S. Pat. No. 5,544,933, issued Aug. 13, 1996 to Shahab et al.; U.S. Pat. No. 5,382,071, issued Jan. 17, 1995 to Enning et al.; U.S. Pat. No. 5,094,504, issued Mar. 10, 1992 to Wurl; U.S. Pat. No. 5,046,778, issued Sep. 10, 1991 to Larsen; U.S. Pat. No. 4,971,359, issued Nov. 20, 1990 to Takahashi et al.; U.S. Pat. No. 4,736,981, issued Apr. 12, 1988 to Barton et al.; and U.S. Pat. No. 4,355,843, issued Oct. 26, 1982 to Murakami.

The following patents are hereby incorporated by reference as if set forth in their entirety herein: U.S. Pat. No. 4,682,812; European Patent No. EP 07 60 329; French Patent No. FR 75 62 86; and European Patent No. EP 07 53 450.

The corresponding foreign and international patent publication applications, namely, Swedish Patent Application No. 9702234-7, filed on Jun. 10, 1997, having inventor Martin Jonsson, and laid open Swedish Patent application No. 9702234-7 and published Swedish Patent Application No. 97702234-7 and PCT/SE98/01123 as well as their published equivalents, and other equivalents or corresponding applications, if any, in corresponding cases in Sweden and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention as described herein above in the context of the preferred embodiments is not to be taken as limited to all of the provided details thereof, since modifications and variations thereof may be made without departing from the spirit and scope of the invention.

What is claimed is:

1. An energy absorbing beam for a motor vehicle comprising:
    an inner beam (12) having a hat shaped profile;
    an outer beam (20) having a hat shaped profile;
    the profile of said inner beam being deeper than the profile of said outer beam;
    each of said inner and outer beams having an opened side oriented in a direction facing outwardly relative to said motor vehicle;
    said outer beam being received in said inner beam.

2. The energy absorbing beam as claimed in claim 1, wherein said inner and outer beams are arranged relative to said motor vehicle such that a portion (27) or at least one door (26) of said motor vehicle is received in a space defined by the opened side of said outer beam when said at least one door of said motor vehicle is pivoted between a closed position and an opened position.

3. The energy absorbing beam as claimed in claim 1, wherein:
    said inner beam has a flange (13, 14);
    said outer beam has a flange (21, 22); and
    means are provided for connecting said flange of said inner beam to said flange of said outer beam for joining said inner and outer beams together.

4. The energy absorbing beam as claimed in claim 3, wherein said flanges on said inner and outer beams are connected at a position on said beam at a distance not greater than one third of the depth of the beam relative to the outer surface of said motor vehicle.

5. An energy absorbing beam for a motor vehicle consisting of:
    an inner beam (12) having a hat shaped profile;
    an outer beam (20) having a hat shaped profile;
    the profile of said inner beam being deeper than the profile of said outer beam;
    each of said inner and outer beams having an opened side oriented in a direction facing outwardly relative to said motor vehicle;
    said outer beam being received in said inner beam.

6. The energy absorbing beam as claimed in claim 5, wherein:
    said inner beam has a flange (13, 14);
    said outer beam has a flange; (21, 22) and
    means are provided for connecting said flange of said inner beam to said flange of said outer beam for joining said inner and outer beams together.

7. The energy absorbing beam as claimed in claim 4, wherein said flanges on said inner and outer beams are connected at a position on said beam at a distance not greater than one third of the depth of the beam relative to the outer surface of said motor vehicle.

8. An energy absorbing beam for a motor vehicle comprising:
    an inner beam (12) having a hat shaped profile;
    said inner beam having an opened side oriented in a direction facing outwardly relative to said motor vehicle;
    an outer beam (20) mounted over said opened side of said inner beam;
    said inner and outer beams having flanges (13, 14; 21, 22);
    means for connecting said flanges of said inner and outer beams for joining said inner and outer beams together;
    said inner and outer beams and flanges being arranged such that said flanges are connected at a position on said beam at a distance not greater than one third of the depth of the beam relative to the outer surface of said motor vehicle.

* * * * *

UNITED STATES PATENT AND TRADEMARK OFFICE
CERTIFICATE OF CORRECTION

PATENT NO. : 6,572,181 B2
DATED : June 3, 2003
INVENTOR(S) : Martin Jonsson

It is certified that error appears in the above-identified patent and that said Letters Patent is hereby corrected as shown below:

<u>Column 4, line 17 through Column 5, line 5,</u>
Delete in its entirety.

<u>Column 6,</u>
Line 23, delete "claim 4" and substitute -- claim 6 --.

Signed and Sealed this

Twenty-third Day of September, 2003

JAMES E. ROGAN
*Director of the United States Patent and Trademark Office*